United States Patent
Lundin et al.

(10) Patent No.: US 11,162,221 B2
(45) Date of Patent: Nov. 2, 2021

(54) METHOD FOR PRODUCING PAPER, BOARD OR THE LIKE

(71) Applicant: Kemira Oyj, Helsinki (FI)

(72) Inventors: Tom Lundin, Turku (FI); Kaisa Karisalmi, Helsinki (FI); Heikki Sojakka, Markaryd (SE)

(73) Assignee: Kemira Oyj, Helsinki (FI)

( * ) Notice: Subject to any disclaimer, the term of this patent is extended or adjusted under 35 U.S.C. 154(b) by 11 days.

(21) Appl. No.: 16/496,459

(22) PCT Filed: Mar. 29, 2018

(86) PCT No.: PCT/FI2018/050234
§ 371 (c)(1),
(2) Date: Sep. 23, 2019

(87) PCT Pub. No.: WO2018/178518
PCT Pub. Date: Oct. 4, 2018

(65) Prior Publication Data
US 2020/0141061 A1    May 7, 2020

(30) Foreign Application Priority Data

Mar. 29, 2017  (FI) ............................ 20175288
Mar. 29, 2017  (FI) ............................ 20175289

(51) Int. Cl.
*D21H 11/18*    (2006.01)
*D21H 17/37*    (2006.01)
(Continued)

(52) U.S. Cl.
CPC ........... *D21H 11/18* (2013.01); *D21H 17/375* (2013.01); *B32B 27/10* (2013.01); *D21H 17/25* (2013.01); *D21H 21/10* (2013.01); *D21H 21/20* (2013.01)

(58) Field of Classification Search
CPC ...... D21H 11/18; D21H 17/375; D21H 17/25; D21H 21/10; D21H 21/20; D21H 17/21; D21H 17/33; D21H 17/44; B32B 27/10
See application file for complete search history.

(56) References Cited

U.S. PATENT DOCUMENTS

| 6,602,994 B1 * | 8/2003 | Cash | A61K 8/027 |
| | | | 536/30 |
| 2013/0180680 A1 * | 7/2013 | Axrup | D21H 17/24 |
| | | | 162/177 |
| 2015/0218756 A1 * | 8/2015 | Kosonen | D21H 17/675 |
| | | | 162/141 |

FOREIGN PATENT DOCUMENTS

| EP | 2639351 A1 | 9/2013 |
| FI | 20155952 A | 6/2017 |

(Continued)

OTHER PUBLICATIONS

Finnish Patent and Registration Office, Search Report of FI20175288, dated Nov. 30, 2017, 2 pages.

(Continued)

*Primary Examiner* — Eric Hug
*Assistant Examiner* — Matthew M Eslami
(74) *Attorney, Agent, or Firm* — Meunier Carlin & Curfman LLC

(57) ABSTRACT

The invention relates to a method for producing paper, board or the like. The method comprises obtaining a fibre stock comprising lignocellulosic fibres and adding a retention agent system comprising a cationic synthetic polymer to the fibre stock and forming a fibrous web from the fibre stock and drying the web. Microfibrillated non-wood cellulose is added to the fibre stock as a component of the retention agent system and sequentially with the cationic synthetic polymer.

23 Claims, 5 Drawing Sheets

(51) Int. Cl.
*B32B 27/10* (2006.01)
*D21H 17/25* (2006.01)
*D21H 21/10* (2006.01)
*D21H 21/20* (2006.01)

(56) References Cited

FOREIGN PATENT DOCUMENTS

| | | |
|---|---|---|
| JP | H0813380 A | 1/1996 |
| JP | H09158081 A | 6/1997 |
| JP | H09218528 A | 8/1997 |
| JP | 3125475 B2 | 1/2001 |
| WO | 2011055017 A1 | 5/2011 |
| WO | 2012039668 A1 | 3/2012 |
| WO | 2013061266 A1 | 5/2013 |
| WO | 2014029916 A1 | 2/2014 |

OTHER PUBLICATIONS

Finnish Patent and Registration Office, Search Report of FI20175289, dated Dec. 21, 2017, 2 pages.

\* cited by examiner

# METHOD FOR PRODUCING PAPER, BOARD OR THE LIKE

This application is a U.S. national application of the international application number PCT/FI2018/050234 filed on Mar. 29, 2018 and claiming priority of Finnish applications 20175288 and 20175289 filed on Mar. 29, 2017 the contents of all of which are incorporated herein by reference.

The present invention relates to a method for producing paper, board or the like according to the preambles of the enclosed independent claim.

In paper and board making solid particles of the fibre stock, such as inorganic mineral filler particles, fibre fines, added process chemicals, etc. are captured in the formed fibre web. This process is called retention. For economical and qualitative points of view, good and uniform retention of the various fibre stock components to the formed web is advantageous, as it reduces loss of additives and improves the quality of the formed paper. The retention has become more and more important when the use of recycled fibres have been increasing in the paper and board making. Fibre stock which contains large portion of recycled fibres, typically shows shorter average fibre length and higher amounts of solids, which can be classified as fines. Furthermore, fibre stock based on recycled fibres may have significant amount of disturbing substances. Retention of short fibres, fines and/or other substances with small size, is demanding and needs careful attention.

Various retention agents are available, and they can be added to the fibre stock in order to improve the retention of additives, fibre fines, disturbing substances, etc. to the cellulosic fibres and to the formed web. Retention agents are usually synthetic or semi-synthetic polymeric compounds. Use of synthetic polymers increases the costs, which is not preferred when cheaper grades of paper and board are produced. It should be noted that these cheaper grades commonly employ recycled fibres and/or other less perfect fibre material as raw material.

Consequently, there is a need for new effective retention systems, which would be economically competitive, produce good quality end product and suitable for short-fibre stock comprising high amount of fines.

In view of the ecological impact of the polymer manufacture and the on-going discussion of the possible harmful environmental effects of the extensive polymer usage, there is also growing need for alternative solutions to synthetic polymeric compounds. There is an emerging desire to reduce the use of synthetic chemicals also in paper and board making and to further improve the environmental aspects and sustainability of cellulosic products by using alternative chemicals and additives based on natural substances, which preferably are even biodegradable.

Dust formation is a problem in paper and board making as well as converting and printing processes. Dust contains small particles, which can be either organic, such as fibres fines, or inorganic, such as filler particles. Small dust particles are easily accumulated to the open structures and cavities of the production machinery or equipment, which consequently become dirty and require regular cleaning. It is especially problematic if the dust prevents the functioning of optical or other measurement devices, as this may lead to erroneous data from production and/or false production procedures. Furthermore, the dust may wear down production equipment. For example, dust between a cylinder and a doctor blade may cause erosion of the blade or damage the drying fabrics. Organic dust may also pose a fire safety problem, especially on areas with elevated temperatures.

Dust formation has been reduced by using various anti-dusting agents that has been added to the fibre stock or applied on the formed web. However, there is still need for new effective methods with which dust formation during paper or board making can be reduced in a simple manner.

The object of the present invention is to minimize or even eliminate the disadvantages existing in the prior art.

An object of the invention is to provide a method with which the effective and uniform retention of fibre stock components is achieved.

Another object of the invention is to improve the retention of fibre stock components while at least maintaining the drainage properties.

Yet another object of the invention is to provide a method with which the dust formation during paper or board making can be reduced.

These objects are attained with the invention having the characteristics presented below in the characterising parts of the independent claims. Some preferable embodiments are disclosed in the dependent claims.

Typical method for producing paper, board or the like, is defined in the claims. The method comprises at least following steps obtaining a fibre stock comprising lignocellulosic fibres and adding a retention agent system comprising a cationic synthetic polymer to the fibre stock, forming a fibrous web from the fibre stock and drying the web, wherein microfibrillated cellulose is added to the fibre stock as a component of the retention agent system and sequentially with the cationic synthetic polymer.

Now it has been surprisingly found out that microfibrillated cellulose, especially when comprising microfibrillated non-wood cellulose, improves the retention when it is used together a cationic synthetic polymer as a component of a retention agent system. Use of microfibrillated cellulose makes it possible to reduce the amount of the cationic synthetic polymer, while still providing as good, or even better, retention results. In this manner it is possible to provide more sustainable alternative that can be used for improving retention of fillers, fines and/or other additives. Furthermore, it was unexpectedly observed that the specific combination of the components of the retention agent system as defined in the present invention may also provide improvement in the drainage of the fibre stock.

DETAILED DESCRIPTION OF INVENTION

Figure 1:
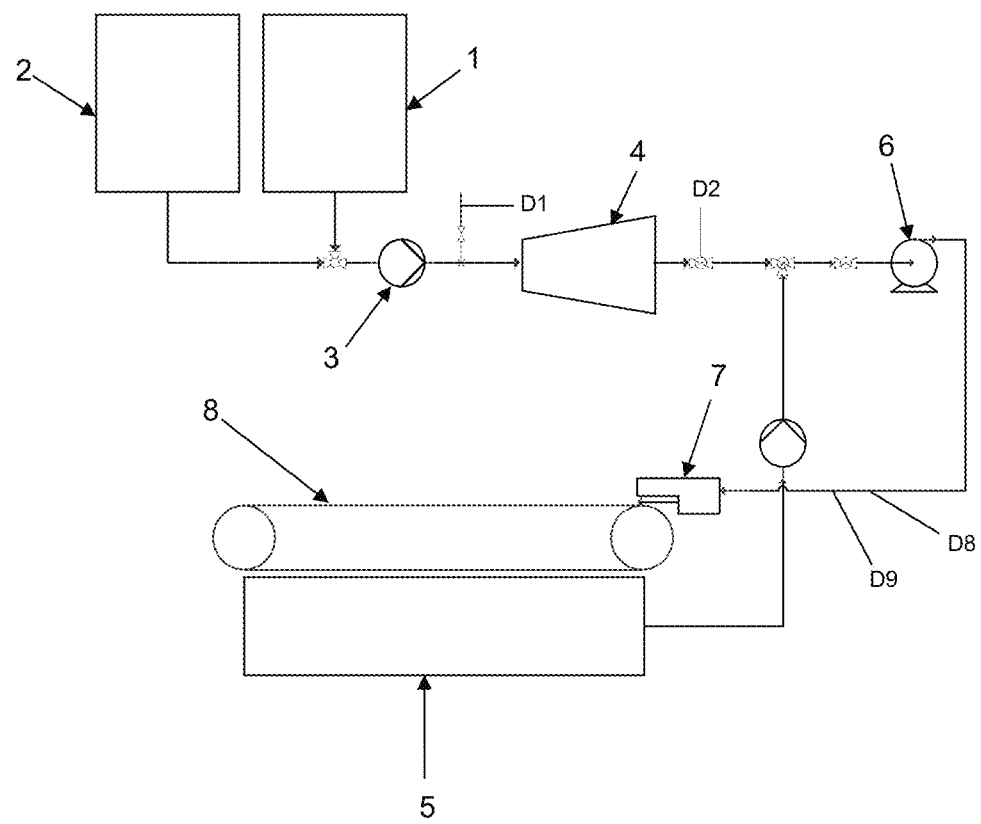
FIG. 1 shows a schematic illustration of the pilot maching set-up. Possible chemical dosage locations are indicated in the figure.

In the context of the present application the term "microfibrillated cellulose" is understood as liberated, sometimes semi-crystalline, cellulosic fibril structures or as liberated bundles of nanosized cellulose fibrils. Microfibrillated cellulose has a diameter of 2-60 nm, preferably 4-50 nm, more preferably 5-40 nm, and a length of several micrometres, preferably less than 500 µm, more preferably 2-200 µm, even more preferably 10-100 µm, most preferably 10-60 µm. Microfibrillated cellulose comprises often bundles of 10-50 microfibrils. Microfibrillated cellulose may have high degree of crystallinity and high degree of polymerization, for example the degree of polymerisation DP, i.e. the number of monomeric units in a polymer, may be 100-3000. Further, microfibrillated cellulose may have as a suspension a high elastic modulus, for example in the range of $10\text{-}10^5$ Pa.

The microfibrillated cellulose, which is used as a component of the retention agent system, comprises microfibrillated cellulose that originates from non-wood sources, and preferably comprises microfibrillated parenchymal cellulose. The microfibrillated cellulose may originate from vegetables, such as sugar beet pulp, potato pulp, cassava pulp, sweet potato; fruits, such as citrus peel; cellulose pith, such as bagasse pith, corn pith, bamboo pith; and mixtures thereof. It has been observed that microfibrillated non-wood cellulose is easy to handle in process conditions prevailing in manufacture of paper, board or the like. Further, microfibrillated non-wood cellulose provides good results when used as a component in the retention agent system, which also comprises synthetic cationic polymer.

According to one embodiment the microfibrillated cellulose may comprise microfibrillated cellulose that originates from hardwood or softwood or their mixture. Preferably cellulose fibres originating from hardwood are used for producing the microfibrillated cellulose. The hardwood cellulose fibres may be selected from birch fibres, eucalyptus fibres, acacia fibres, aspen fibres, maple fibres, poplar fibres, locust fibres or any mixture thereof. According to one preferable embodiment the microfibrillated cellulose comprises microfibrillated cellulose originating from bleached birch fibres. The wood cellulose fibres may be manufactured by using any conventional pulping process and they may be bleached or unbleached.

According to one embodiment of the invention the microfibrillated cellulose comprises both microfibrillated cellulose from non-wood sources, as well as microfibrillated cellulose that originates from hardwood, softwood or their mixtures.

Preferably the amount of microfibrillated cellulose from non-wood sources is higher than the amount of microfibrillated cellulose that originates from hardwood, softwood or their mixtures.

In the present context the term "microfibrillated parenchymal cellulose" means microfibrillated cellulose that is obtained by fibrillating plant-based cellulose rich material comprising essentially primary cell wall structures, i.e. parenchymal cells. The microfibrillated cellulose thus comprises cellulose fibrils originating from primary cell wall structures, i.e. parenchymal cells. Parenchyma is here understood as basic tissue of plants, containing cells with thin primary cell walls. The cortex and pith of the stem, the internal layers of leaves, and the soft parts of fruits and vegetables are made of parenchyma. Parenchyma cells remain alive at maturity, and perform various functions, such as water storage, replacement of damaged tissue, and physical support of plant structures. The parenchymal cellulose, which is microfibrillated, is obtained from non-wood sources, which preferably comprises thin and flexible primary cell walls and is devoid of secondary cell wall structures. The microfibrillated parenchymal cellulose may originate from vegetables, such as sugar beet pulp, potato pulp, cassava pulp, sweet potato; fruits, such as citrus peel; cellulose pith, such as bagasse pith, corn pith, bamboo pith; and mixtures thereof.

According to one preferable embodiment of the invention the microfibrillated cellulose of the retention agent system comprises mainly or essentially of microfibrillated non-wood cellulose. According to yet another embodiment of the invention the microfibrillated cellulose comprises mainly or essentially of microfibrillated parenchymal cellulose. According to one embodiment the microfibrillated cellulose is microfibrillated parenchymal cellulose.

According to one embodiment of the invention the microfibrillated cellulose which comprises or consists of microfibrillated parenchymal cellulose has

- a Brookfield viscosity of at least 10 Pas, preferably at least 100 Pas, measured at concentration of 1.0 weigh-% at 100 rpm shear rate, and/or
- a turbidity value less than 1000 NTU, preferably in the range of 100-700 NTU, measured at 0.1 weight-% concentration, and/or
- a net charge in the range of −0.001-−1.99 meq/g, preferably −0.01-−1.50 meq/g, more preferably −0.05-−1.0 meq/g, at pH 7.5.

In general, high viscosity and low turbidity indicate good degree of fibrillation of the microfibrillated cellulose comprising or consisting of microfibrillated parenchymal cellulose. According to one embodiment of the invention the microfibrillated cellulose comprising or consisting of microfibrillated parenchymal cellulose has a Brookfield viscosity in the range of 0.01-10 000 Pas, preferably 10-10 000 Pas, more preferably 100-10 000. Pas, even more preferably 200-850 measured at concentration of 1.0 weigh-% at 100 rpm shear rate, using Brookfield DV3T viscometer (Brookfield Engineering Laboratories, Middleboro, USA) equipped with a vane geometry (V-72).

According to one preferable embodiment the Brookfield viscosity of the microfibrillated cellulose comprising or consisting of microfibrillated parenchymal cellulose may be in the range of 500-2000 Pas, preferably 800-1400 Pas, more preferably 900-1300 Pas, measured at concentration of 1.0 weigh-%, with Brookfield DV3T viscometer (Brookfield Engineering Laboratories, Middleboro, USA) equipped with a vane geometry (V-72), at 50 rpm.

Microfibrillated cellulose is typically used, irrespective of its origin, in consistency of 0.5-4 weight-%, preferably 1-2 weight-%. At this consistency microfibrillated cellulose is normally shear thinning, which means that it can be readily pumped and transported in industrial processes. Microfibrillated cellulose can be diluted by dispersing to suitable consistency in a conventional pulper. It is possible to use, for example, from microfibrillated cellulose having high consistency of from 10 to 25 weight-%, preferably from 10 to 15 weight-%, which is dispersed to desired consistency with water in a pulper.

The microfibrillated cellulose of the retention agent system may be added to the fibre stock as added dose, i.e. single dose, or in several doses at different process locations. Microfibrillated cellulose may be added as 1-5 doses. According to one embodiment of the invention at least a part of the microfibrillated cellulose of the retention agent system, preferably all, is added to thick stock having consistency of ≥2 weight-%, preferably 2-6 weight-%, more preferably 3-5 weight-%. It has been observed that the addition of microfibrillated cellulose to the thick stock improves the efficiency of the retention agent system, especially the retention of fine fibre fraction and/or inorganic fillers. It has been also observed that the drainage of the fibre stock may be simultaneously improved.

Microfibrillated cellulose may be added to the fibre stock in a total amount of 1-50 kg, preferably 1-30 kg, more preferably 5-30 kg, even more preferably 10-30 kg, given as dry material per ton of dry solids of the fibre stock. Preferably at least 20%, more preferably at least 50%, even more preferably at least 70% or at least 90%, of the total amount of the microfibrillated cellulose is added to the thick stock. According to one preferable embodiment all microfibrillated cellulose is added to the thick stock.

According to one embodiment the fibre stock comprising microfibrillated cellulose, i.e. fibre stock after the addition of microfibrillated cellulose, is subjected to a mechanical treatment step, where preferably the fibre stock is subjected to a shear force supplied by a mechanical device. Suitable mechanical device may be, for example, defibrator; refiner; high-shear mixer; grinder, comminutor; rotor-stator mixer; rotor-rotor mixer; or ultrasound disintegrator. When the fibre stock and microfibrillated cellulose are subjected simultaneously to the mechanical treatment, such as refining, the fibre surfaces are activated for maximal interaction. The fibre stock, which is subjected to mechanical treatment, may in addition to microfibrillar cellulose comprise also other additives, such as strength agents or drainage agents. The additives may be anionic or cationic. According to one embodiment the additive is cationic starch, which improves the drainage.

The amount of mechanical treatment to which the fibre stock, which comprises microfibrillated cellulose, is subjected, indicated by specific energy consumption (SEC), may be in the range 5-350 kWh/t, preferably 20-250 kWh/t. The mechanical treatment, e.g. refining, grinding, comminuting or disintegrating, may be performed as one treatment or several successive treatments. It has been observed that this mechanical treatment may produce improved drainage of the fibre stock.

Alternatively, the fibre stock comprising microfibrillated cellulose and at least a part of the cationic synthetic polymer of the retention agent system is subjected to the mechanical treatment as described above.

The cationic synthetic polymer of the retention agent system may be selected from polyacrylamide, polyethylene oxide (PEO), homo- or copolymers of diallyldimethylammonium chloride (DADMAC), polyamine, polyethyleneimine (PEI), polyvinyl amine (PVAm) and polydicyandiamide polymer resin. For example, the cationic synthetic polymer of the retention agent system may be high molecular weight polyethylene oxide or a low molecular weight polymer with high charge density, such as homo- or copolymer of diallyldimethylammonium chloride (DADMAC). It is also possible to use a combination of two or several cationic synthetic polymers. The cationic synthetic polymer may be linear or branched, or it may be comb polymer or star shaped polymer.

Preferably the cationic synthetic polymer of the retention agent system is cationic polyacrylamide. According to one preferable embodiment the cationic synthetic polymer, which is used in the retention agent system, may be cationic polyacrylamide having an average molecular weight of 4 000 000-18 000 000 Da, preferably 4 000 000-12 000 000 Da, more preferably 7 000 000-10 000 000 Da, and/or having a charge density of 0.2-2.5 meq/g, preferably 0.5-1.5 meq/g, more preferably 0.7-1.2 meq/g. It has been observed that the selected average molecular weight and/or charge density provide good interaction not only with the fibre stock components, but also with the microfibrillated cellulose, which forms the other component of the retention system. The good interaction makes it possible to reduce the amount of cationic synthetic polymer, if so desired. Furthermore, the fibre stock displays improved retention and drainage in the paper or board making process.

In the context of the present application it is understood that a cationic synthetic polymer may also contain local anionic charges as long as the net charge of the polymer is cationic.

The components of the retention agent system comprising microfibrillated cellulose and cationic synthetic polymer are added sequentially to the fibre stock. Preferably at least a part of the microfibrillated cellulose is added to the fibre stock before the addition of at least a part of the cationic synthetic polymer. More preferably the microfibrillated cellulose and at least 50% of the total amount of the cationic synthetic polymer of the retention agent system are added to the thick stock, in this order, and the remaining amount of cationic synthetic polymer is added to the thin stock. According to one embodiment the time between two successive sequential additions of these components is at the maximum 30 s.

According to one embodiment of the invention the fibre stock may be subjected to a mechanical treatment step or at least one shear stage between the successive sequential additions of the components of the retention agent system comprising microfibrillated cellulose and cationic synthetic polymer. For example, at least a part of the microfibrillated cellulose is added to the fibre stock, the fibre stock is subjected to a shear stage, and then at least part of the cationic synthetic polymer is added to the fibre stock.

The cationic synthetic polymer of the retention agent system may be added to the fibre stock as one added dose, i.e. single dose, or in several doses at different process locations. The cationic synthetic polymer may be added as 1-5 doses, preferably 2-4 doses. According to one embodiment of the invention at least a part of the cationic synthetic polymer is added to the thick stock having consistency of ≥2 weight-%, preferably 2-6 weight-%, more preferably 3-5 weight-%. It was observed that the addition of the cationic synthetic polymer to thick stock produced unexpected improvement in retention and fibre stock drainage.

According to one preferable embodiment of the present invention a first part of the cationic synthetic polymer may be added to thick stock, which has a consistency of ≥2 weight-%, preferably 2-6 weight-%, more preferably 3-5 weight-% and a second part of the cationic synthetic polymer is added to the thin stock having consistency of <2 weight-%, preferably 0.2-1.99 weight-%, more preferably 0.3-1.5 weight-%. It was surprisingly observed that the addition of at least part of the cationic synthetic polymer to the thick stock provided significant improvement in both wire retention and fibre stock drainage.

It was observed that the addition of the cationic synthetic polymer in two or more doses, especially the addition to the thick stock and to the thin stock, may enable use of lower amounts of synthetic polymer, while maintaining or improving the retention and drainage. It is assumed, without being bound by a theory, that the addition of two or more doses has a positive effect of floc formation, thus enhancing both the retention and drainage.

The cationic synthetic polymer of the retention agent system may be added to the fibre stock in a total amount of 0.1-2 kg/t, preferably 0.2-1.5 kg/t. Preferably at least 45%, more preferably at least 60%, even more preferably at least 80%, of the total amount of the cationic synthetic polymer is added to the thick stock. Alternatively, at the most 55%, more preferably at the most 40%, even more preferably at the most 20%, of the total amount of the cationic synthetic polymer is added to the thin stock.

The fibre stock comprises cellulosic fibres which may be obtained by any known pulping process. For example, the fibre stock may comprise cellulosic fibres obtained by mechanical pulping, chemithermomechanical pulping or by repulping recycled or recovered fibres.

According to one preferable embodiment of the invention the fibre stock comprises fibres originating from old corrugated containerboard (OCC) and/or recycled fibre material. OCC may comprise used recycled unbleached or bleached kraft pulp fibres, hardwood semi-chemical pulp fibres, grass pulp fibres or any mixture thereof. According to one embodiment of the invention the fibre stock comprises at least 20 weight-%, preferably at least 50 weight-%, of fibres originating from OCC or recycled fibre material. In some embodiments, the fibre stock may comprise even >70 weight-%, sometimes even >80 weight-%, of fibres originating from OCC or recycled fibre material.

According to one embodiment the microfibrillated cellulose can be added to the thick stock having consistency ≥2 weight-% and used as an anti-dusting agent. A method for reducing dusting in manufacture of paper, board or the like comprises at least the steps of obtaining a fibre stock comprising lignocellulosic fibres and forming a fibrous web from the fibre stock and drying the web, wherein the anti-dusting agent comprising microfibrillated cellulose is added to the thick stock having consistency of ≥2 weight-%. It has been surprisingly found out that addition of microfibrillated cellulose to the fibre stock effectively reduces dust formation during manufacture of paper or board. Sometimes it is possible to obtain improvement in retention and at the same time reduce the dusting. The anti-dusting agent may comprise at least 85 weight-%, preferably at least 90 weight-%, more preferably at least 95 weight-%, even more preferably at least 97 weight-% of microfibrillated cellulose. According to one embodiment of the invention the amount of microfibrillated cellulose in the anti-dusting agent may be in the range of 50-99 weight-%, preferably 85-99 weight-%, more preferably 90-99 weight-%, even more preferably 95-99 weight-%. The percentages are calculated from total dry solids of the anti-dusting agent.

Microfibrillated cellulose in the anti-dusting agent may originate from hardwood or softwood or any of their mixtures, as described above. Alternatively, microfibrillated cellulose in the anti-dusting agent originates from non-wood sources. The microfibrillated cellulose in the anti-dusting agent may be microfibrillated non-wood cellulose and/or microfibrillated parenchymal cellulose. For example, the microfibrillated cellulose in the anti-dusting agent may originate from vegetables, such as sugar beet pulp, potato pulp, cassava pulp, sweet potato; fruits, such as citrus peel; cellulose pith, such as bagasse pith, corn pith, bamboo pith; and mixtures thereof, as described above.

According to one embodiment the anti-dusting agent consists of microfibrillated cellulose. This means that the anti-dusting agent consists solely of microfibrillated cellulose and water, and is free of other components.

According to one embodiment of the invention the anti-dusting agent comprising microfibrillated cellulose is added to thick stock having consistency in the range of 2-6 weight-%, preferably 3-5 weight-%. It is assumed without being bound by any theory that the microfibrillated cellulose is able to interact with the different small fibre stock constituents when added to the thick stock, especially if subjected to mechanical treatment, and to reduce dusting later in the process. The anti-dusting agent may be added to the fibre stock as one single dose or as several doses at different process locations. For example, the anti-dusting agent may be added as 1-5 separate successive doses. The fibre stock comprising anti-dusting agent, i.e. fibre stock after the addition of anti-dusting agent comprising microfibrillated cellulose, may be subjected to a mechanical treatment step, as described above, where preferably the fibre stock is subjected to a shear force supplied by a mechanical device.

Anti-dusting agent may be added to the fibre stock in amount that results in added amount of the microfibrillated cellulose in the range of 1-100 kg, preferably 5-70 kg, more preferably 15-50 kg, given as dry material per ton of dry solids of the fibre stock.

The method for reducing dusting in manufacture of paper, board or the like is suitable for fibre stocks as described above. The fibre stock may comprise, for example, lignocellulosic fibres obtained by mechanical pulping, chemical pulping, chemithermomechanical pulping or by repulping recycled fibres. The fibre stock may comprise bleached or unbleached virgin fibres, either alone or in addition to fibres originating from OCC or recycled fibre material. The method is especially suitable when the fibre stock comprises at least 10 weight-%, preferably at least 15 weight-%, more preferably at least 20 weight-%, of fibre fines. The amount of fibre fines in the fibre stock may be in the range of 1-30 weight-%, preferably 10-30 weight-%.

When anti-dusting agent comprising microfibrillated cellulose is added to the thick stock, it is further possible to add strength agents and retention agents to the fibre stock in addition of the anti-dusting agent. The strength agents and/or retention agents may be added to the thick stock or to the thin stock. It is possible use the same cationic synthetic polymers as described above as retention agents.

Microfibrillar cellulose is suitable as anti-dusting agent for manufacture of different grades of printing paper, sack paper, paper board and tissue.

EXPERIMENTAL

Some embodiments of the invention are disclosed in the following non-limiting examples.

Retention Example 1

Performance of a retention agent systems comprising microfibrillated cellulose and a cationic synthetic polymer was tested in pilot paper machine using a dry paper grade on-roll manufactured from recycled fibre grades. The fibre stock was prepared batch-wise by slushing ca. 75 kg dry paper into 3 m$^3$ local tap water, temperature 8-10° C.

The prepared fibre stock was subjected to mixing, pumping and a mild refining (resembling a deflaking step) at 2.25 weigh-% feed consistency in an Esser-Wysch 13A refiner, operating to provide ca. 4 kWhit to the fibre stock.

Targeted white water conditions were: conductivity 8000 mS/cm; calcium level 800 ppm $Ca^{2+}$; charge level 1500 meq/l. The anionic trash levels were adjusted by addition of calcium propionate (Caldic, Espoo, Finland), $Na_2SO_4$ (Algol, Espoo, Finland) and anionic carboxymethyl cellulose Staflo Exlo (Akzo Nobel, Gothenburg, Sweden). These additions were made to the re-pulped papermaking fibre stock as follows: first 3.72 g/l of calcium propionate is added to reach conductivity of 3500 mS/cm, followed by addition of 4.67 g/l of $Na_2SO_4$ and 3.5 mg/l of carboxymethyl cellulose, in this order.

The prepared fibre stock was fed to a pilot paper machine and diluted to headbox consistency with white water. The volume of the white water was ca 8.5 m³ per pulped batch as follows: pulper 2 m³; four mixing chests 5 m³; white water circulation ca. 1.5 m³. The fibre stock was formed into a web on the wire, speed 30 m/min, while passing four vacuum boxes, one vacuum roll and two nips, 50 MPa and 70 MPa and 11 drying cylinders having average effect of 120 kW at a production rate of ca. 90 kg/h.

A schematic illustration of the pilot machine set-up is shown in FIG. 1. Possible chemical dosage locations are indicated in FIG. 1. Thick stock having consistency >2 weight-% was fed from machines chest 1, 2 to low consistency refiner 4. First dosing point D1 for a component of the retention agent system was located before pump 3 and the second dosing point D2 was located after refiner 4. First and second dosing points D1, D2 dosed components to the thick stock.

After the refiner 4 the thick stock was diluted with white water to thin stock by pumping white water from white water tank 5 and mixing it with thin stock. Thin stock is then pumped by pump 6 to the headbox 7. The consistency of the obtained thin stock was 0.45-0.55 weight-%. Further dosing points D8, D9 were located after dilution stage but before the headbox 7 and forming wire 8. Conventionally retention agents are added to the thin stock at dosing points D8 and D9 or their immediate vicinity.

The retention agent system in Retention Example 1 comprised sugar beet based microfibrillated cellulose (MFC), solid content 12 weight-%, as well as a cationic synthetic polymer (Fennopol K3400, Kemira Oyj). Furthermore, a retention/drainage agent: an anionic silica sol (ECA NP2180, AkzoNobel Ab) was added to the fibre stock.

The added amounts of microfibrillated cellulose and the cationic synthetic polymer, as well as their dosage locations, are given in Table 1.

Drainage rate of the fibre stock in Table 1 is given as drainage capacity, which is measured by using a modified CSF-device with the bottom nozzle plugged, unit [mL/10 s], as well as Schopper-Riegler value, which is measured straight from the fibre stock, by using 4-4.65 g/l stock, unit [°SR]. Overall water retention level, FPR, was determined by using head box (HB) and wire water (WW) consistencies [weight-%].

TABLE 1

Amounts of used MFC and other chemicals, dosage locations and retention results.

| # | MFC [kg/t] | Pos. | Synt. Polymer [kg/t] | Pos. | Fennozil 2180 [kg/t] | Pos. | Drainage [ml/10 s] | [° SR] | FPR [%] |
|---|---|---|---|---|---|---|---|---|---|
| reference | 0.0 |   | 0.2 | 8 | 2.0 | 9 | 260.0 | 85.5 | 87.4 |
| 19 | 10.0 | 1 | 0.2 | 8 | 2.0 | 9 | 210.0 | 87.0 | 87.4 |
| 20 | 20.0 | 1 | 0.2 | 8 | 2.0 | 9 | 200.0 | 87.0 | 86.7 |
| 21 | 30.0 | 1 | 0.2 | 8 | 2.0 | 9 | 200.0 | 87.5 | 86.9 |
| 27 | 20.0 | 1 | 0.3 & 0.2 | 2 & 8 | 2.0 | 9 | 250.0 | 81.5 | 93.5 |
| 28 | 20.0 | 1 | 0.6 & 0.2 | 2 & 8 | 2.0 | 9 | 280.0 | 76.0 | 94.6 |
| 35 | 20.0 | 1 | 0.3 | 2 | 2.0 | 9 | 230.0 | 83.0 | 92.8 |
| 36 | 20.0 | 1 | 0.6 | 2 | 2.0 | 9 | 250.0 | 74.5 | 92.8 |

Pos. = Position of addition, see FIG. 1

It is seen from Table 1 that in Tests 27 and 28 where microfibrillar cellulose was added in position 1 and the cationic synthetic polymer was added in both positions 2 and 8, the drainage and wire retention FPR increased significantly in comparison to Test 20 or to the reference. It is also seen that increase in added polymer dose causes a clear increase in drainage (Test 28). On the other hand, similar drainage and retention results can be obtained with smaller dose (Test 27 vs Test 36). This means that addition of cationic synthetic polymer to both thick and thin stock improves the retention and drainage simultaneously when the amount of added microfibrillar cellulose is constant.

When single additions of the synthetic polymer are compared with each other, it is seen that the addition in position 2, i.e. thick stock, yields better wire retention results.

Retention Example 2

Retention Example 2 was conducted in the similar manner than Retention Example 1, but different dry paper grade on-roll manufactured from recycled fibre grades was used. The fibre stock was otherwise prepared in the same way.

The prepared fibre stock was subjected to mixing, pumping and a mild refining (resembling a deflaking step) at 2.25 weigh-% feed consistency in an Esser-Wysch 13A refiner, operating to provide ca. 17 kWh/t to the fibre stock.

Targeted white water conditions were: conductivity 3500 mS/cm; calcium level 100 ppm $Ca^{2+}$; charge level 200 meq/l. The anionic trash levels were adjusted by addition of calcium propionate (Caldic, Espoo, Finland), $Na_2SO_4$ (Algol, Espoo, Finland) and anionic carboxymethyl cellulose Staflo Exlo (Akzo Nobel, Gothenburg, Sweden). These additions were made to the repulped papermaking fibre stock as follows: first 0.46 g/l of calcium propionate is added to reach conductivity of 3500 mS/cm, followed by addition of 2.5 g/l of $Na_2SO_4$ and 3.5 mg/l of carboxymethyl cellulose, in this order.

The prepared fibre stock was fed to a pilot paper machine and diluted as described in Retention Example 1.

The retention agent system and other chemicals in Retention Example 2 were the same as in Retention Example 1.

The added amounts of microfibrillated cellulose and the cationic synthetic polymer, as well as their dosage locations, are given in Table 2. The retention results are defined in the same manner as in Retention Example 1.

It can be seen from Table 2 that Test 10 with addition of the cationic synthetic polymer at both positions 2 and 8 resulted higher wire retention FPR than Test 3 or the reference. Drainage seemed to remain at the same level in all test points, i.e. no significant impairment could be observed.

TABLE 2

Amounts of used MFC and other chemicals, dosage locations and retention results.

| # | MFC [kg/t] | Pos. | Synt. Polymer [kg/t] | Pos. | Fennozil 2180 [kg/t] | Pos. | Drainage [ml/10 s] | [° SR] | FPR [%] |
|---|---|---|---|---|---|---|---|---|---|
| reference | 0.0 | | 0.2 | 8 | 2.0 | 9 | 240.0 | 82.0 | 85.8 |
| 2 | 10.0 | 1 | 0.2 | 8 | 2.0 | 9 | 250.0 | 87.0 | 90.4 |
| 3 | 20.0 | 1 | 0.2 | 8 | 2.0 | 9 | 230.0 | 86.0 | 88.7 |
| 4 | 30.0 | 1 | 0.2 | 8 | 2.0 | 9 | 210.0 | 91.0 | 85.6 |
| 10 | 20.0 | 1 | 0.3 & 0.2 | 2 & 8 | 2.0 | 9 | 220.0 | 87.0 | 90.4 |
| 11 | 20.0 | 1 | 0.6 & 0.2 | 2 & 8 | 2.0 | 9 | 220.0 | 87.0 | 87.6 |

Pos. = Position of addition, see FIG. 1

Anti-dusting Example 1

Performance of an anti-dusting agent comprising microfibrillated cellulose was tested in pilot paper machine. The overall dry paper production rate was 90 kg/h.

In test experiments anti-dusting agent, which comprised sugar beet based microfibrillated cellulose (MFC) solid content 12 weight-%, was added in amount that resulted in addition of 30 kg/t of microfibrillated cellulose. In reference experiments no anti-dusting agent was added. Otherwise the conditions in the test experiments and the reference experiments were identical.

The experiments were conducted by using two different fibre stocks, A and B. Fibre stock A was a central European quality with fibre fine content of ca. 25%. Fibre stock B comprised a fraction of longer (Northern Pine) softwood fibres.

The size class data determined by dynamic light scattering method indicated reduction of the number/share of small particles in the dust released from the moist web on the metal scraper on the first drying cylinder. Results are shown in Table 3.

TABLE 3

Results of Anti-dusting Example 1

| | MFC dose [kg/t] | Particles, <50 μm, [%] | Particles, <100 μm [%] | Particles, <150 μm [%] | Particles, >1500 μm [%] |
|---|---|---|---|---|---|
| reference | 0 | 14.4 | 30.7 | 42.3 | 0.3 |
| reference | 0 | 16.8 | 35.8 | 47.8 | 0.1 |
| test 1 | 30 | 12.1 | 26.5 | 38.7 | n.a. |

Anti-Dusting Example 2

Figure 2:
FIG. 2 shows cleaned blade on a drying cylinder, first run.

The anti-dusting effect of the invention is visualised with the aid of following photographic figures:

FIG. 2 shows cleaned blade on a drying cylinder, first run.

Figure 3:
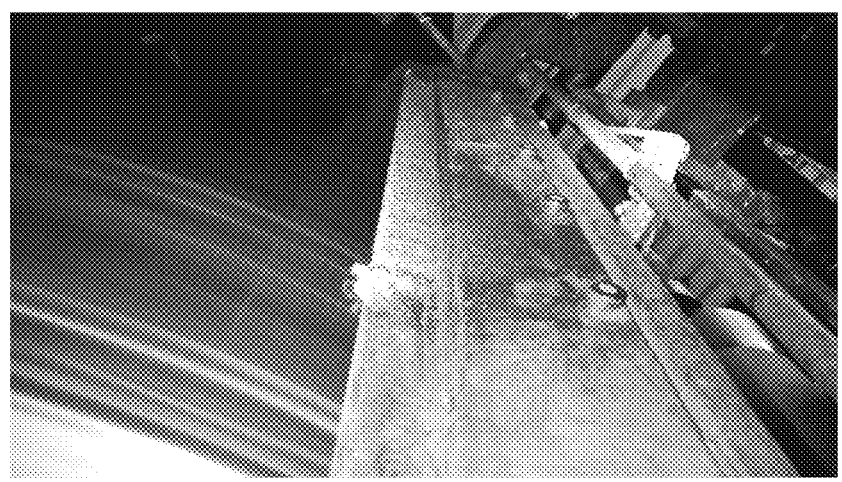
FIG. 3 shows the blade of FIG. 2 after 15 min of the fun when using fibre stock comprising recycled fibres, without anti-dusting agent comprising microfibrillated cellulose.

FIG. 3 shows the blade of FIG. 2 after 15 min of the run when using fibre stock comprising recycled fibres, without anti-dusting agent comprising microfibrillated cellulose.

Figure 4:
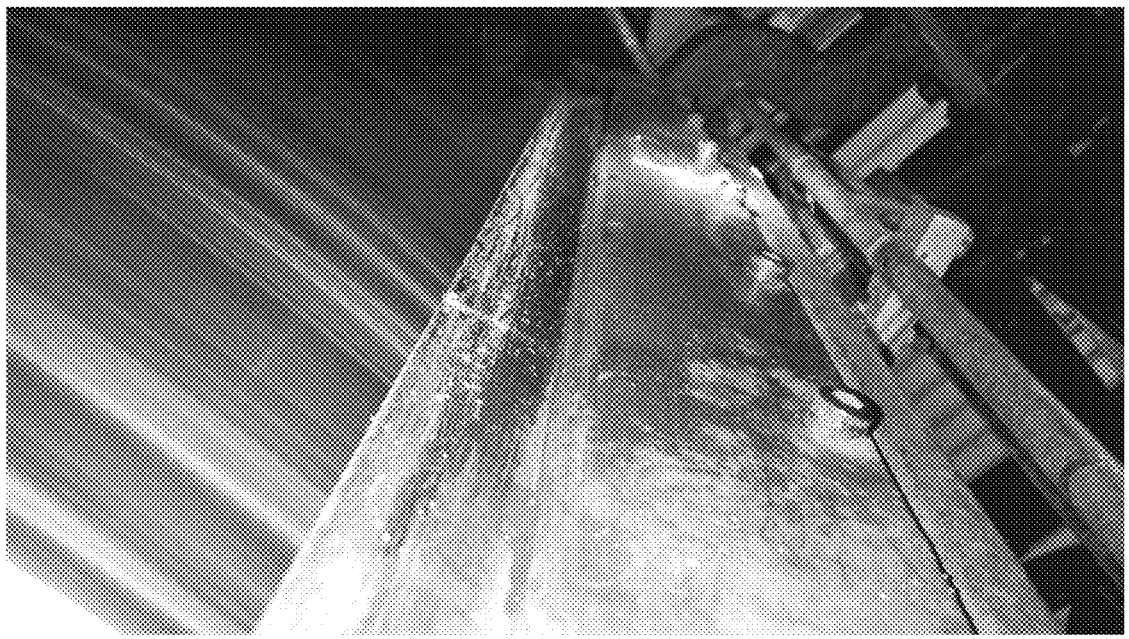
FIG. 4 shows cleaned blade on a drying cylinder, second run.

FIG. 4 shows cleaned blade on a drying cylinder, second run.

Figure 5:
FIG. 5 shows the blade of FIG. 4 after 15 min of the second run when using fibre stock comprising recycled fibres, with anti-dusting agent comprising microfibrillated cellulose. The dosage of microfibrillated cellulose is 20 kg/t. The fibre stock comprises also 3 kg/t of cationic strength polymer.

FIG. 5 shows the blade of FIG. 4 after 15 min of the second run when using fibre stock comprising recycled fibres, with anti-dusting agent comprising microfibrillated cellulose. The dosage of microfibrillated cellulose is 20 kg/t. The fibre stock comprises also 3 kg/t of cationic strength polymer.

Figure 6:
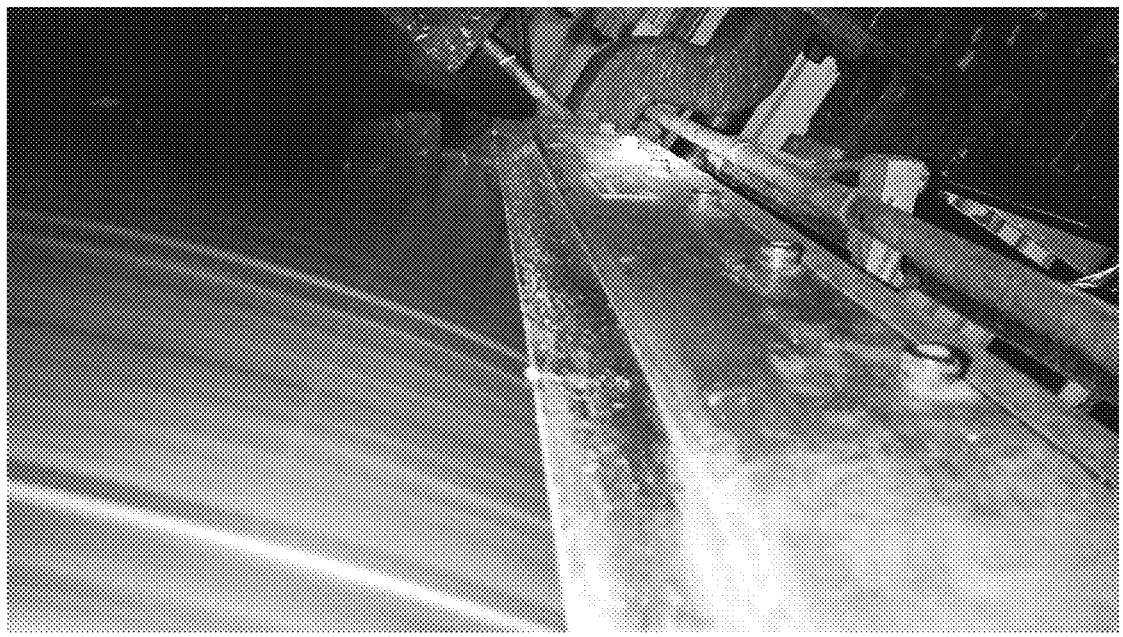
FIG. 6 shows cleaned blade on a drying cylinder, third run.

FIG. 6 shows cleaned blade on a drying cylinder, third run.

Figure 7:
FIG. 7 shows the blade of FIG. 6 after 15 min of the third run when using fibre stock comprising recycled fibres, with anti-dusting agent comprising microfibrillated cellulose. The dosage of microfibrillated cellulose is 30 kg/t, the fibre stock is different from the fibre stock used in first and second runs.

FIG. 7 shows the blade of FIG. 6 after 15 min of the third run when using fibre stock comprising recycled fibres, with anti-dusting agent comprising microfibrillated cellulose. The dosage of microfibrillated cellulose is 30 kg/t, the fibre stock is different from the fibre stock used in first and second runs.

Figure 8:
FIG. 8 shows cleaned blade on a drying cylinder, fourth run.

FIG. 8 shows cleaned blade on a drying cylinder, fourth run.

Figure 9:
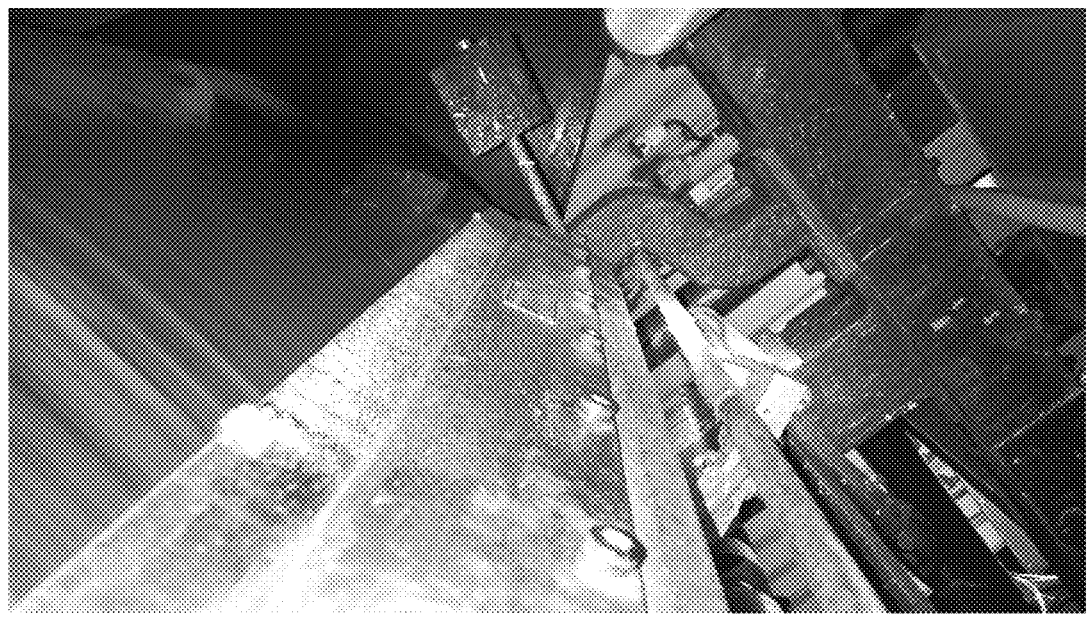
FIG. 9 shows the blade of FIG. 8 after 15 min of the fourth run when using fibre stock comprising recycled fibres, without anti-dusting agent comprising microfibrillated cellulose.

FIG. 9 shows the blade of FIG. 8 after 15 min of the fourth run when using fibre stock comprising recycled fibres, without anti-dusting agent comprising microfibrillated cellulose.

It is seen from the figures that the amount of fine dust on the blade is clearly reduced, when the stock comprised anti-dusting agent, which comprises microfibrillated cellulose.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for producing a paper, or a board, comprising:
   obtaining a fibre stock comprising lignocellulosic fibres;
   adding a retention agent system comprising a cationic synthetic polymer, the cationic synthetic polymer being a cationic polyacrylamide having a charge density of 0.2-2.5 meq/g to the fibre stock;
   adding microfibrillated cellulose comprising microfibrillated non-wood cellulose originating from vegetables, fruits, cellulose pith, or mixtures thereof to the fibre stock as a component of the retention agent system sequentially with the cationic synthetic polymer, wherein a first part of the cationic synthetic polymer is added to a thick stock having a consistency of >2 weight-%, and a second part of the cationic synthetic polymer is added to a thin stock having a consistency of <2 weight-%;

and forming a fibrous web from the fibre stock and drying the web.

2. The method according to claim 1, wherein the microfibrillated cellulose additionally comprises microfibrillated cellulose originating from hardwood or softwood.

3. The method according to claim 1, wherein the microfibrillated cellulose originates from the group consisting of vegetable-material selected from sugar beet pulp, potato pulp, cassava pulp, and sweet potato fruit materials including citrus peel, cellulose pith, selected from bagasse pith, corn pith, and bamboo pith, and mixtures thereof.

4. The method according to claim 1, wherein at least a part of the microfibrillated cellulose is added to the thick stock having consistency of >2 weight-%.

5. The method according to claim 1, wherein the microfibrillated cellulose is microfibrillated parenchymal cellulose.

6. The method according to claim 1, wherein the microfibrillated cellulose is obtained by fibrillating plant-based cellulose rich material comprising essentially primary cell wall structures.

7. The method according to claim 1, wherein the microfibrillated cellulose is added to the fibre stock in a total amount of 1 50 kg, given as dry material per ton of dry solids of the fibre stock.

8. The method according to claim 1, wherein the retention agent system additionally comprises a cationic synthetic polymer selected from a group comprising polyethylene oxide (PEO), homo- or copolymers of diallyldimethylammonium chloride (DADMAC), polyamine, polyethyleneimine (PEI), polyvinyl amine (PVAm) and polydicyandiamide polymer resin.

9. The method according to claim 1, wherein the cationic polyacrylamide has an average molecular weight of 4 000 000-18 000 000 Da.

10. The method according to claim 1, wherein at least 45%, of the total amount of the cationic synthetic polymer is added to the thick stock.

11. The method according to claim 1, wherein the microfibrillated cellulose and at least 50% of the total amount of the cationic synthetic polymer of the retention agent system are added to the thick stock, in this order, and the remaining amount of cationic synthetic polymer is added to the thin stock.

12. The method according to claim 1, wherein at least a part of the microfibrillated cellulose is added to the fibre stock before addition of the cationic synthetic polymer.

13. The method according to claim 1, wherein the cationic synthetic polymer is added in a total amount of 0.1-2 kg/t.

14. The method according to claim 1, wherein the fibre stock comprises cellulosic fibres obtained by mechanical pulping, chemithermomechanical pulping or by repulping recycled fibres or recovered fibres.

15. The method according to claim 1, wherein the fibre stock after the addition of microfibrillated cellulose is subjected to a mechanical treatment step, where the fibre stock is subjected to a shear force supplied by a mechanical device.

16. The method according to claim 1, wherein the fibre stock is subjected to a mechanical treatment in amount in the range 5-350 kWh/t, indicated by specific energy consumption (SEC).

17. The method according to claim 7, wherein the microfibrillated cellulose is added to the fibre stock in a total amount of 1-30 kg, given as dry material per ton of dry solids of the fibre stock.

18. The method according to claim 17, wherein the microfibrillated cellulose is added to the fibre stock in a total amount of 10-30 kg, given as dry material per ton of dry solids of the fibre stock.

19. The method according to claim 9, wherein the cationic polyacrylamide has an average molecular weight of 4 000 000-12 000 000 Da.

20. The method according to claim 9, wherein the cationic polyacrylamide has a charge density of 0.5-1.5 meq/g.

21. The method according to claim 20, wherein the cationic polyacrylamide has a charge density of 0.7-1.2 meq/g.

22. The method according to claim 10, wherein at least 60% of the total amount of the cationic synthetic polymer is added to the thick stock.

23. The method according to claim 22, wherein at least 80% of the total amount of the cationic synthetic polymer is added to the thick stock.

* * * * *